US008370353B2

(12) United States Patent
Rathod et al.

(10) Patent No.: US 8,370,353 B2
(45) Date of Patent: Feb. 5, 2013

(54) COMPONENT PART SEARCH SYSTEM WITH PUBLIC AND PRIVATE COMMUNITIES

(75) Inventors: Nainesh B Rathod, West Lafayette, IN (US); Jamie Tan, West Lafayette, IN (US)

(73) Assignee: Imaginestics LLC, West Lafayette, IN (US)

( * ) Notice: Subject to any disclaimer, the term of this patent is extended or adjusted under 35 U.S.C. 154(b) by 790 days.

(21) Appl. No.: 12/256,745

(22) Filed: Oct. 23, 2008

(65) Prior Publication Data

US 2009/0106204 A1    Apr. 23, 2009

Related U.S. Application Data

(60) Provisional application No. 60/981,992, filed on Oct. 23, 2007.

(51) Int. Cl.
*G06F 17/30* (2006.01)

(52) U.S. Cl. .......................................... 707/736; 707/783

(58) Field of Classification Search .................. 707/736, 707/783
See application file for complete search history.

(56) References Cited

U.S. PATENT DOCUMENTS

| | | | | |
|---|---|---|---|---|
| 5,873,080 A | * | 2/1999 | Coden et al. | 707/999.003 |
| 6,888,549 B2 | * | 5/2005 | Bregler et al. | 345/474 |
| 7,181,419 B1 | * | 2/2007 | Mesaros | 705/26.2 |
| 7,660,738 B1 | * | 2/2010 | Siegel et al. | 705/20 |
| 7,680,770 B1 | * | 3/2010 | Buyukkokten et al. | 707/758 |
| 2002/0168117 A1 | * | 11/2002 | Lee et al. | 382/305 |
| 2005/0055344 A1 | * | 3/2005 | Liu et al. | 707/3 |
| 2005/0132224 A1 | * | 6/2005 | Estrada et al. | 713/201 |
| 2005/0289131 A1 | * | 12/2005 | Aenlle et al. | 707/3 |
| 2006/0136842 A1 | * | 6/2006 | Charles et al. | 715/825 |
| 2007/0299833 A1 | * | 12/2007 | Viljamaa et al. | 707/4 |
| 2008/0085049 A1 | * | 4/2008 | Naske et al. | 382/154 |
| 2008/0104227 A1 | * | 5/2008 | Birnie et al. | 709/224 |
| 2008/0250021 A1 | * | 10/2008 | Boys et al. | 707/9 |
| 2010/0082615 A1 | * | 4/2010 | Clinchant et al. | 707/728 |

* cited by examiner

*Primary Examiner* — Son T Hoang

(74) *Attorney, Agent, or Firm* — Taft Stettinius & Hollister LLP; Keith Swedo

(57) ABSTRACT

A method of providing a searchable parts database includes collecting component part data from a plurality of users to form a component part database. An exclusive group is formed including a subset of the users. User members of the exclusive group are provided with access to the component part data contributed to the database by other user members of the exclusive group. Users excluded from the exclusive group are denied access to the component part data contributed to the database by the user members of the exclusive group. The user members in the exclusive group are enabled to provide images of desired component parts and to search the component part database based upon the images of desired component parts.

19 Claims, 4 Drawing Sheets

COMPONENT PART SEARCH SYSTEM WITH PUBLIC AND PRIVATE COMMUNITIES

RELATED APPLICATIONS

This application claims the benefit of U.S. Provisional Application 60/981,992 filed Oct. 23, 2007, which is hereby incorporated by reference herein.

SUMMARY OF THE INVENTION

The present invention provides a computer networking system that enables users to share with each other databases of component parts that the users may need in industrial applications. Each user may contribute images and other data describing parts that the particular user is capable of providing to other users of the community. Some users may only be potential buyers of parts and may not have any of their own parts to provide. Each user may control which of the other users have access to the data associated with that user's contributed part data. The users may form exclusive groups wherein each member of the group approves the inclusion of each of the other members, and each member is given access to the part data provided by each of the other members. Other members of the community who are not in the exclusive group would be denied access to the common part data associated with the exclusive group. Each member of such an exclusive group may have a contractual relationship to produce a certain end product. Alternatively, or in addition, each member of such an exclusive group may represent a different link in a supply chain to provide a certain end product.

Although excluded community members who have not been approved by the exclusive group members for inclusion in the exclusive group may not have access to the common part data of the exclusive group, individual members of the exclusive group may provide an excluded member with access to that individual member's part data.

The users of the community may utilize a search engine to search for parts that match the image that a searcher may provide. For example, a user who is searching for a part may provide a two- or three-dimensional doodle (e.g., mouse-drawn sketch), two-dimensional drawing, three-dimensional model, or any type of two-dimensional images or pictures.

The invention comprises, in one form thereof, a method of providing a searchable parts database, including collecting component part data from a plurality of users to form a component part database. An exclusive group is formed including a subset of the users. User members of the exclusive group are provided with access to the component part data contributed to the database by other user members of the exclusive group. Users excluded from the exclusive group are denied access to the component part data contributed to the database by the user members of the exclusive group. The user members in the exclusive group are enabled to provide images of desired component parts and to search the component part database based upon the images of desired component parts.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Although the exemplification set out herein illustrates embodiments of the invention, in several forms, the embodiments disclosed below are not intended to be exhaustive or to be construed as limiting the scope of the invention to the precise forms disclosed.

DESCRIPTION OF THE PRESENT INVENTION

The embodiments hereinafter disclosed are not intended to be exhaustive or limit the invention to the precise forms disclosed in the following description. Rather the embodiments are chosen and described so that others skilled in the art may utilize its teachings.

Figure 1:
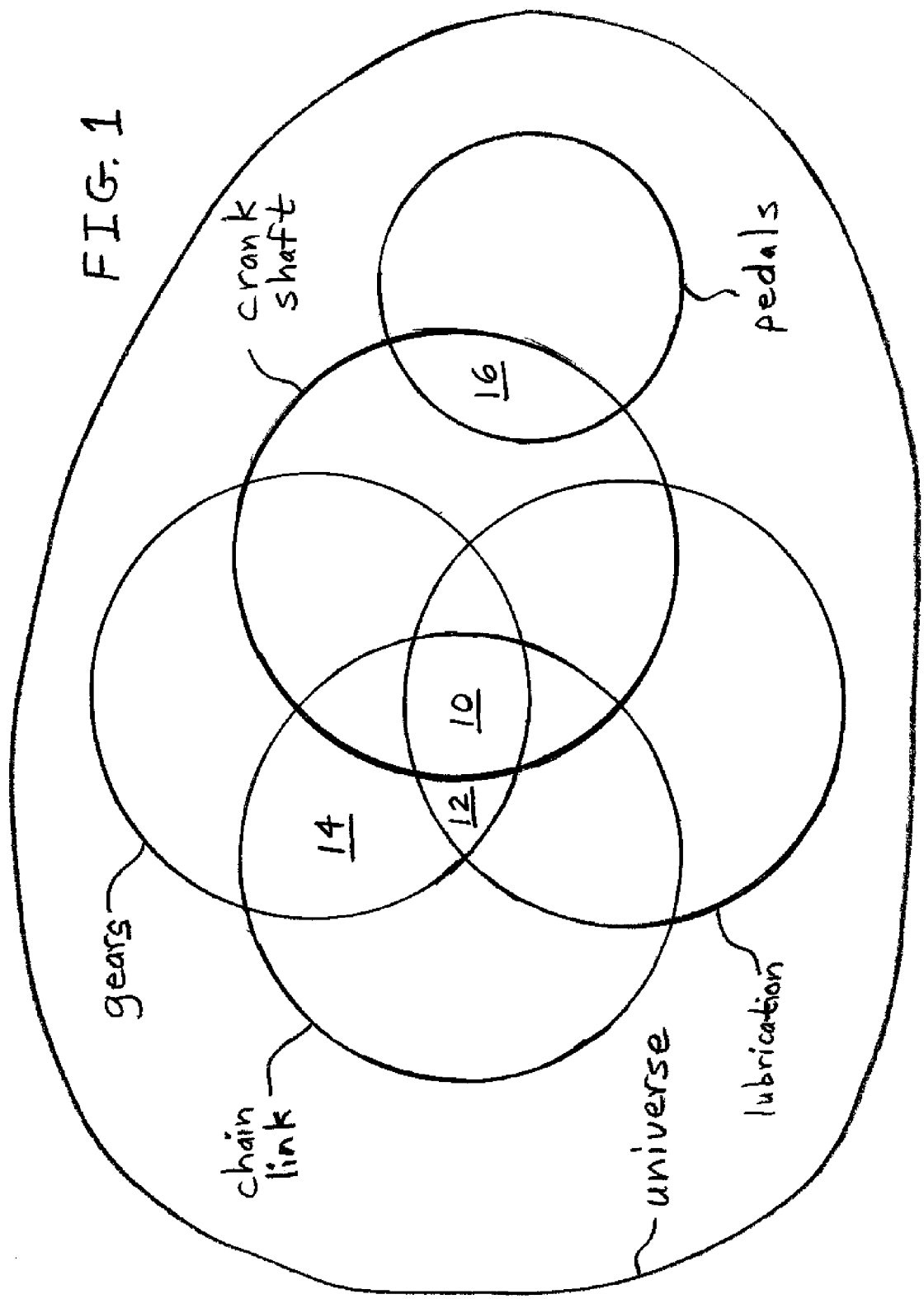
FIG. 1 is a diagram of shared data groupings in one embodiment of a shared database system of the present invention.

Referring now to FIG. 1, there is shown a diagram of a database divided into a plurality of exclusive groupings according to one embodiment of the present invention. A database, or "universe," of component part data is collected from a plurality of users, only a selected few of the users being referred to in FIG. 1 in order to simplify the illustration. Each of the circles in FIG. 1 represents component part data that has been contributed to the database by a chain link manufacturer, a lubrication supplier, a gear manufacturer, a crank shaft manufacturer, and a pedal manufacturer, respectively.

The chain link manufacturer, lubrication supplier, gear manufacturer, and crank shaft manufacturer may agree to form an exclusive group wherein each of the four members contributes data to a shared portion 10 of the database. Other users of the database who are excluded from the exclusive group, such as the pedal manufacturer, may be denied access to the shared data in database portion 10.

There may be exclusive sub-groups set up to include two or three of the members in the four-member exclusive group described above. For example, the gear manufacturer, the chain link manufacturer, and the lubrication supplier may have component part data that one or more of these three members does not wish to share with the crank shaft manufacturer. Thus, the three members may elect to form another shared portion 12 of the database that the three members all have access to, and may search, but that the crank shaft manufacturer cannot access.

Similarly, any two of the four members may form another sub-group that is accessible by only the two members. For example, the gear manufacturer and the chain link manufacturer may have component part data that one or both of these two members does not wish to share with either of the crank shaft manufacturer and the lubrication supplier. Thus, the two members may elect to form another shared portion 14 of the database that the two members both have access to, and may search, but that the crank shaft manufacturer and the lubrication supplier cannot access.

The chain link manufacturer, lubrication supplier, gear manufacturer, and crank shaft manufacturer may have an interest in forming an exclusive group because they are contractually obligated to cooperate to manufacture a drive system, for example. As another example, all four members may just have an interest in buying and/or selling their parts to each other because of an existing working relationship, or because they are familiar with each other's part quality.

The pedal manufacturer may supply pedals to the bicycle industry, and so may be interested in purchasing crank shafts from the crank shaft manufacturer to which to attach his pedals. Thus, the pedal manufacturer and the crank shaft manufacturer may choose to form another shared portion 16 of the database that the two members both have access to, and may search, but that any other users of the database cannot access.

Figure 2:
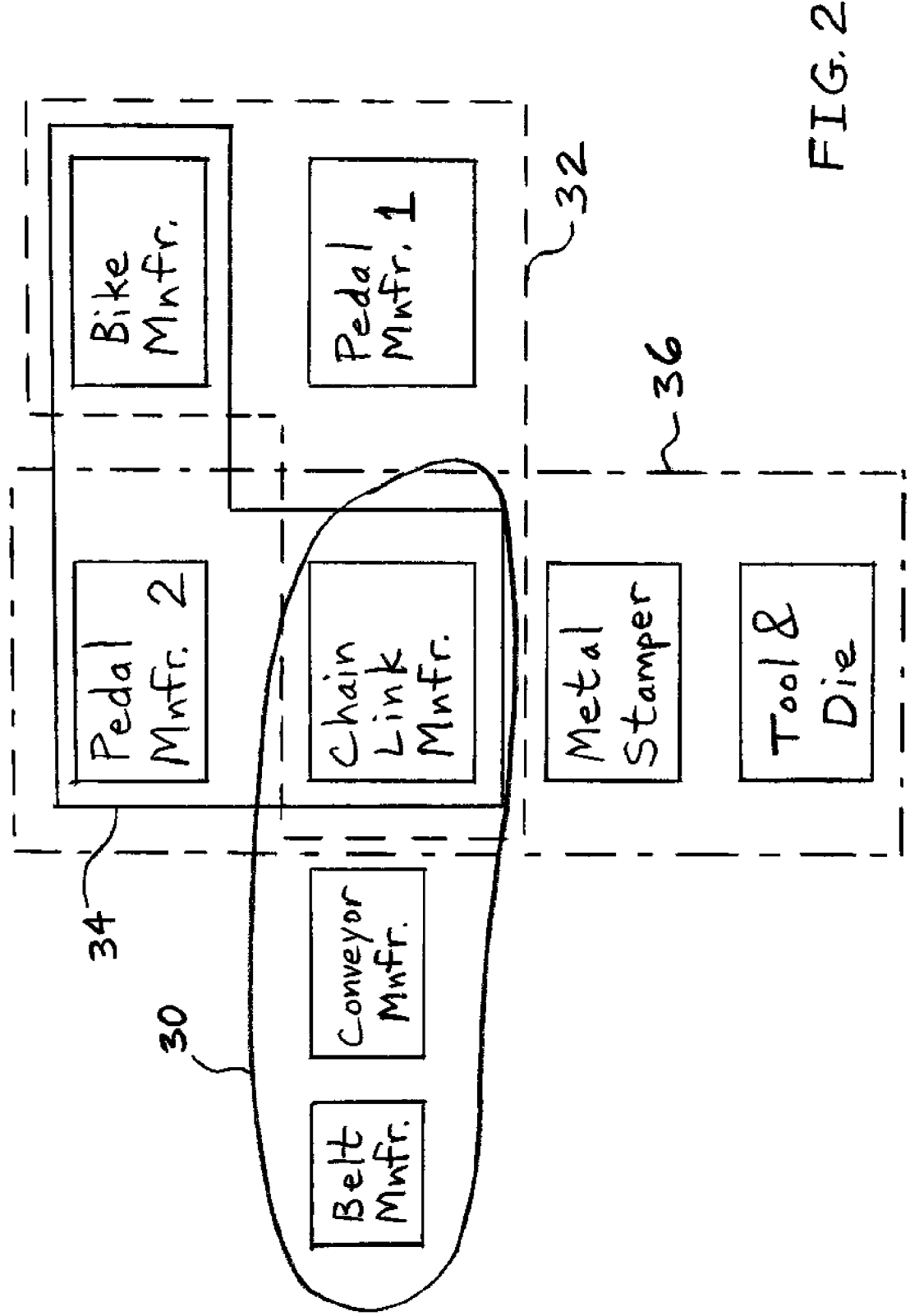
FIG. 2 is another diagram illustrating the forming of exclusive groups between various suppliers.

FIG. 2 is another diagram illustrating the forming of exclusive groups between various suppliers. The conveyor manufacturer may regularly purchase components from the belt manufacturer and the chain link manufacturer, and thus the three entities may form an exclusive group 30.

The chain link manufacturer and a first pedal manufacturer may sell their products to a bike manufacturer. The bike manufacturer may request or require that the three parties form an exclusive group 32 so that all three parties have access to component part data of all three parties. The bike manufacturer may produce a different set of bikes using the pedals sold by a second pedal manufacturer and the chain links provided by the chain link manufacturer. Thus, the bike manufacturer may request or require that pedal manufacturer 2 join the bike manufacturer and the chain link manufacturer in forming another exclusive group 34 so that all three of these parties have access to the component part data of each other.

The chain link manufacturer may obtain his raw materials from a metal stamper who, in turn, uses tooling from a tool and die provider. The chain links produced via this supply chain may be sold to a second pedal manufacturer, and thus these four entities may form an exclusive group 36.

In one embodiment, the database is maintained on a single website. When a member of one or more exclusive groups searches for a particular part, he may automatically search all of the portions of the database to which he has been given access. That is, the portions of the database that are being searched on the searcher's behalf may be transparent to the searcher. Alternatively, the searcher may conduct searches within the confines of the data available to a single exclusive group. The data associated with a combination of two or more user-selected exclusive groups may also be searched in a single search. The data available to all users may automatically be included in all searches.

In addition to buyers and sellers of component parts, other parties may be included in an exclusive group as affiliate members. Such affiliate members may have circles of influence on other database users or non-database users such that their having access to the data of an exclusive group may benefit the members of the exclusive group. Such an affiliate member may be an investor, for example. Thus, an affiliate member may be a member of the exclusive group but contributes no component part data to the exclusive group's shared portion of the component part database.

Members of an exclusive group may become such by invitation of one or more of the members of the exclusive group. Each exclusive group may have a ruler or host who decides to which parties invitations are extended. The members and/or the ruler may also have the power to remove a member from the exclusive group.

A member who would like to set up an exclusive group or "community" may pay a fee to the host/operator of the database in order to do so.

Figure 3:
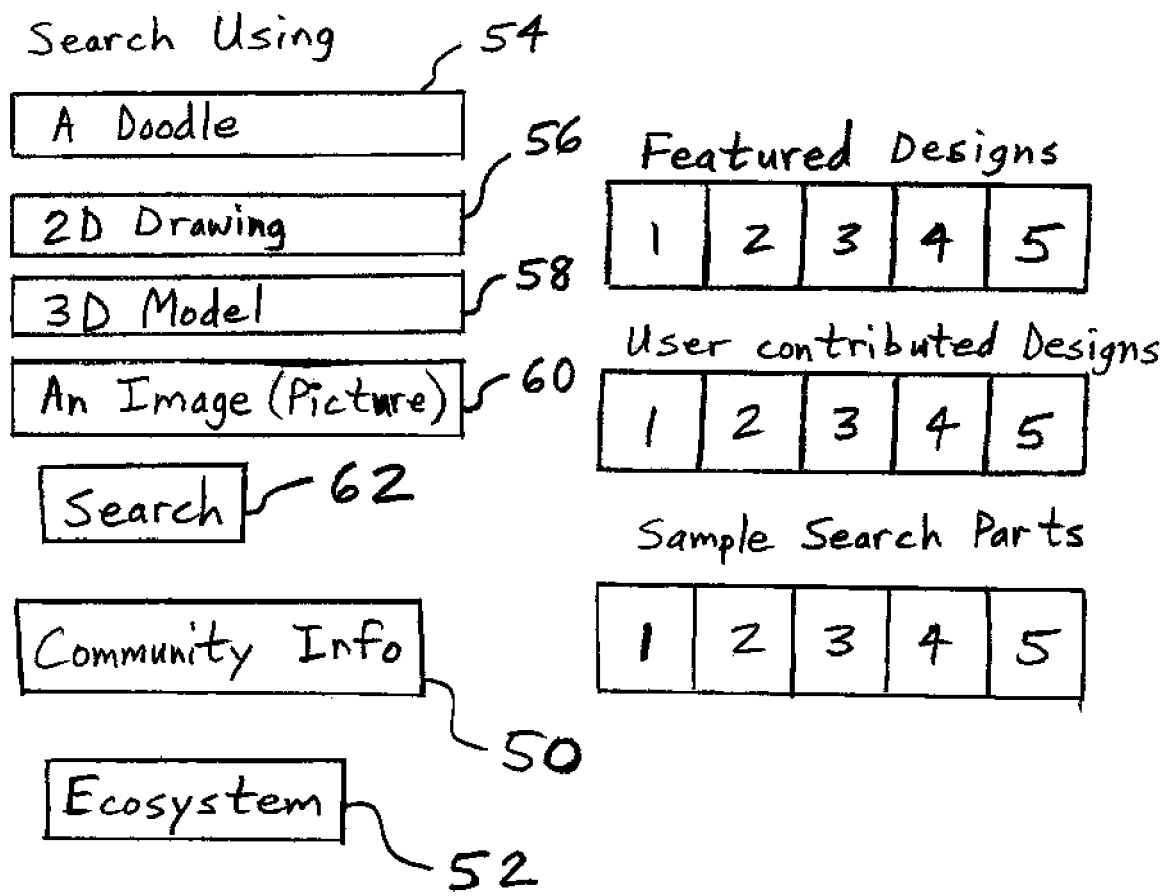
FIG. 3 is an exemplary display screen on a website that hosts a shared database system of the present invention.

A display screen from a website that hosts the shared database of the present invention is illustrated in FIG. 3. A user may click on a Community Information icon 50 to reference a list of databases or portions of a database that are available for searching on the website. The user may also click on an Ecosystem icon 52 to reference and select one or more exclusive groups of which he is a member.

After selecting a database and perhaps one or more exclusive groups whose data is to be searched, the user may select his mode of providing input for the component search. For example, the user may select one of the Doodle icon 54, the 2D Drawing icon 56, the 3D Model icon 58, or the image (picture/photograph) icon 60. After providing the input data search term in the chosen manner, the user may click on a Search icon 62 to begin the search.

Figure 4:
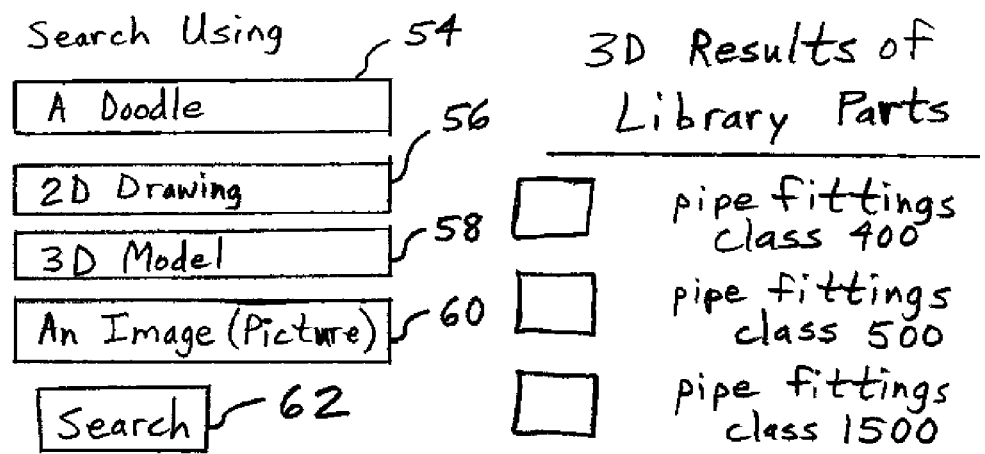
FIG. 4 is another exemplary display screen on a website that hosts a shared database system of the present invention.

As shown in the screen display of FIG. 4, the search results may be divided into two classes: 3D Results of Library Parts (parts found in the database that may be viewed by all users), and 3D Results of User Shared Parts (parts in the database that are provided by certain users of the database, such as members of one or more exclusive groups).

For the sake of brevity, the database may be referred to herein as storing images or image data related to the component parts. However, it is to be understood that the database may actually store the shape representations of three-dimensional models and two-dimensional drawings and related data, such as images for thumbnail displays and three-dimensional/two-dimensional light viewable files, e.g., i3D format, which is proprietary to Imaginestics, LLC. "Image data", as used herein, may include not just an image expressed in ones and zeros, which is a static snapshot of an object, or a representation of a component model. Rather, "image data" may incorporate a component model, which may include a plurality of two-dimensional images from different viewpoints in three-dimensional space, i.e., a three-dimensional model, as well as names/descriptors of models/parts, part numbers, and other identification and sourcing information.

A user in the form of an organization, such as a company, may designate each of its employees as being part of the "user" such that each of the employees has equal access rights to the database. Alternatively, different classifications of employees may be provided with different levels of access. For example, employees in purchasing and sales may be provided with the full access rights of the user, while employees in manufacturing may be provided with access to only the component parts that the user contributed to the database.

In another embodiment, a user may designate one or more partners that are provided with the same access rights to the database that the user is provided with. Other users who are members of the same shared portion of the database as the user may be informed of the access rights being provided to a newly added partner so that the other users may have the option of preventing the newly added partner from accessing the component parts of the other users. For example, an other user may consider the newly added partner to be a competitor of the other user, and thus may request that the newly added partner not have access to the other user's parts in the database.

The searching of the database may be performed as disclosed in U.S. Patent Application Publication No. 2004/0249809, titled METHODS, SYSTEMS, AND DATA STRUCTURES FOR PERFORMING SEARCHES ON THREE DIMENSIONAL OBJECTS, published Dec. 9, 2004, or in International Application No. PCT/US2007/062734, titled METHOD OF ENABLING A USER TO DRAW A COMPONENT PART AS INPUT FOR SEARCHING COMPONENT PARTS IN A DATABASE, filed Feb. 23, 2007, each of which is expressly incorporated herein by reference.

Although the present invention has been described herein as applying to a database of component parts, in another embodiment the database includes descriptions of services that may performed on, or related to, the component parts or that may be performed independently of the component parts. For example, a user may furnish an image of a desired component part and a keyword description of a service related to the component part and may search the user's accessible portions of the database based upon the furnished image of the desired component part and the keyword description.

The component may be provided to the database by one user, and the description of the services related to the component may be provided by another user. The component and the description of the related services may be disposed in a same shared portion of the database.

In one embodiment, the user may select whether the component part or the keyword description of the service related to the component part is to be the primary search term. For example, if the component part is the primary search term, then a first part of the search process may be based on the component image alone, and the second part of the search process may include finding services related to the results of the first part of the search. Conversely, if the keyword description of the service is the primary search term, then a first part of the search process may be based on the keyword(s) alone, and the second part of the search process may include finding component parts on which the results of the first part of the search may be performed. Regardless of whether the user selects the component part or the keyword description of the service related to the component part to be the primary search term, the user may then sort the final search results in order of relevance to the component part or in order of relevance to the service description.

In another embodiment, the database includes data identifying users who are able to manufacture or otherwise supply a search result item, even if the manufacturer/supplier is not the user who contributed the search result item to the database. For example a first user may contribute a design for a particular component to the database. A second user who is a member of the group that has access to that particular portion of the database may identify itself as a potential source of the particular component. Thus, when the particular component appears in search results, a link identifying the user who is the potential source of the component may appear adjacent to the component in the presentation of the search results.

The party who requested the search may click on the link identifying the user who is the potential source of the component. The party may then request a quote of how much money the source user would charge the party to supply the particular component. The party may then be prompted to answer one or more predetermined questions as inputs to the calculation of the quote. A quote may then automatically be provided to the party by the source user within a few seconds based upon a quote formula or lookup table.

In another embodiment, users may be automatically organized into groups that share respective portions of the database based upon characteristics and/or qualifications of the users. That is, at least some groups are not "manually" put together by users selecting each other individually, but rather are automatically put together based on objective criteria. For example, users may be classified or put into groups by their industry, size, or some proxy for size such as revenue, geographic location, and/or accreditations, such as those meeting ISO 9000 standards set by the international organization for standardization.

While this invention has been described as having an exemplary design, the present invention may be further modified within the spirit and scope of this disclosure. This application is therefore intended to cover any variations, uses, or adaptations of the invention using its general principles.

What is claimed is:

1. A method utilizing at least one computer for providing a searchable parts database, the method comprising:
    collecting data associated with component parts and services related to the component parts from a plurality of manufacturers of the component parts and services to form a component part database;
    forming a first exclusive group including a first subset of the manufacturers;
    providing the manufacturers who are members of the exclusive group with access to a first portion and to other portions of the component part database, the first portion being contributed to the component part database by the manufacturers who are members of the exclusive group;
    denying users excluded from the exclusive group access to the first portion of the component part database;
    providing the users excluded from the exclusive group with access to the other portions of the component part database;
    forming a second exclusive group including a second subset of users who are manufacturers of the component parts and services, the second subset including at least one but not all members of the first subset and at least one but not all of the users excluded from the first subset;
    providing the manufacturers who are members of the second exclusive group with access to a second portion of the component part database, the second portion being contributed to the component part database by the manufacturers who are members of the second exclusive group;
    denying users excluded from the second exclusive group access to the second portion of the component database;
    providing the users excluded from the second exclusive group with access to the other portions of the component database; and
    enabling each of the users to:
        furnish an image of a desired component part and a keyword description of a service related to the desired component part;
        select either one of the desired component part and the keyword description to be a primary search term and other term to be a secondary search term correspondingly; and
        search only the portions of the component database to which each user has been provided access, the searching being based upon the furnished image of the desired component part and the keyword description of the related service and being dependent upon the selection of the primary search term and the secondary search term.

2. The method of claim 1 comprising further steps of:
    segregating search results into component part data from the users who are members of the exclusive group and component part data from the users who are not members of the exclusive group; and
    presenting the segregated search results simultaneously on a same display screen.

3. The method of claim 1 comprising a further step of selecting whether the image of the desired component part is presented as a doodle, a two-dimensional drawing, a three-dimensional model, or a photograph.

4. The method of claim 1, wherein the members of the exclusive group each manufactures at least one component part of an end product, component part data corresponding to each the manufactured component part being included in the first portion of the component part database.

5. The method of claim 1 comprising a further step of providing a business partner of one of the manufacturers with access to the component part database equivalent to the manufacturer's access to the component part database.

6. The method of claim 5, wherein another manufacturer is provided with an option to block the business partner's access to the component part data contributed to the component part database by the other manufacturer.

7. The method of claim 1, wherein a search result item is contributed by a first manufacturer member of the exclusive group, the search results identifying a second manufacturer member of the exclusive group who offers to supply the search result item.

8. The method of claim 1, wherein the search results include a link enabling the searching party to obtain a monetary quote from the second manufacturer member for supplying the search result item.

9. The method of claim 1 comprising a further step of providing results of the searching such that the results are segregated on a same display screen between component part data from the first portion of the component part database and component part data from the other portions of the component part database.

10. A computer system comprising at least a computer processor and a computer memory to implement a method of providing a searchable parts database, the method comprising:
   collecting data associated with component parts and services related to the component parts from a plurality of manufacturers of the component parts and services to form a component part database;
   forming a first exclusive group including a first subset of the manufacturers;
   providing the manufacturers who are members of the exclusive group with access to a first portion and to other portions of the component part database, the first portion being contributed to the component part database by the manufacturers who are members of the exclusive group;
   denying users excluded from the exclusive group access to the first portion of the component part database;
   providing the users excluded from the exclusive group with access to the other portions of the component part database;
   forming a second exclusive group including a second subset of users who are manufacturers of the component parts and services, the second subset including at least one but not all members of the first subset and at least one but not all of the users excluded from the first subset;
   providing the manufacturers who are members of the second exclusive group with access to a second portion of the component part database, the second portion being contributed to the component part database by the manufacturers who are members of the second exclusive group;
   denying users excluded from the second exclusive group access to the second portion of the component database;
   providing the users excluded from the second exclusive group with access to the other portions of the component database; and
   enabling each of the users to:
      furnish an image of a desired component part and a keyword description of a service related to the desired component part;
      select either one of the desired component part and the keyword description to be a primary search term and other term to be a secondary search term correspondingly; and
      search only the portions of the component database to which each user has been provided access, the searching being based upon the furnished image of the desired component part and the keyword description of the related service and being dependent upon the selection of the primary search term and the secondary search term.

11. The computer system of claim 10, wherein the method comprising a further step of a user selecting whether the image of the desired component part or the keyword description of the service shall be a primary search term.

12. The computer system of claim 11 wherein the method comprising a further step of the user selecting whether search results are presented in order of relevance to the image of the desired component part or to the description of services.

13. The computer system of claim 10, wherein the method comprising further steps of:
   aggregating search results into data from the providers who are members of the exclusive group and data from the users who are not members of the exclusive group; and
   presenting the segregated search results simultaneously on a same display screen.

14. The computer system of claim 10, wherein the method comprising a further step of selecting whether the image of the desired component part is presented as a doodle, a two-dimensional drawing, a three-dimensional model, or a photograph.

15. The computer system of claim 10, wherein the method comprising a further step of selecting a portion of the component part database to be searched.

16. The computer system of claim 10, wherein at least one user who is a member the members of the exclusive group contributes no data to the first portion of the component part database each provides at least one component part or service related to a component part of an end product, component parts and services data corresponding to each the manufactured component part and each the service being included in the first portion of the component part database.

17. The computer system of claim 10, wherein the method comprising a further step of providing a business partner of one of the manufacturers with access to the component part database equivalent to the manufacturer's access to the component part database.

18. A non-transitory computer-readable storage medium storing computer instructions executable by at least one computer to implement a method of providing a searchable parts database, the method comprising:
   collecting data associated with component parts and services related to the component parts from a plurality of manufacturers of the component parts and services to form a component part database;
   forming a first exclusive group including a first subset of the manufacturers;
   providing the manufacturers who are members of the exclusive group with access to a first portion and to other portions of the component part database, the first portion being contributed to the component part database by the manufacturers who are members of the exclusive group;
   denying users excluded from the exclusive group access to the first portion of the component part database;
   providing the users excluded from the exclusive group with access to the other portions of the component part database;
   forming a second exclusive group including a second subset of users who are manufacturers of the component parts and services, the second subset including at least one but not all members of the first subset and at least one but not all of the users excluded from the first subset;

providing the manufacturers who are members of the second exclusive group with access to a second portion of the component part database, the second portion being contributed to the component part database by the manufacturers who are members of the second exclusive group;

denying users excluded from the second exclusive group access to the second portion of the component part database;

providing the users excluded from the second exclusive group with access to the other portions of the component part database; and enabling each of the users to:
    furnish an image of a desired component part and a keyword description of a service related to the desired component part;
    select either one of the desired component part and the keyword description to be a primary search term and other term to be a secondary search term correspondingly; and
    search only the portions of the component part database to which each user has been provided access, the searching being based upon the furnished image of the desired component part and the keyword description of the related service and being dependent upon the selection of the primary search term and the secondary search term.

19. The non-transitory computer-readable storage medium of claim 18, wherein the first and second exclusive groups are automatically formed based upon objective characteristics of the users.

* * * * *